Patented June 23, 1942

2,287,154

UNITED STATES PATENT OFFICE 2,287,154

PHOSPHORIC ACID DICHLORIDES OF COMPOUNDS HAVING A BACTERICIDAL ACTION AND PROCESS FOR THE MANUFACTURE OF SAME

Kurt Warnat, Basel, Switzerland, assignor to Hoffmann-La Roche Inc., Nutley, N. J., a corporation of New Jersey No Drawing. Application July 24, 1939, Serial No. 286,298. In Germany July 30, 1938

9 Claims. (Cl. 260—397.7)

Phosphoric acid dichlorides of the general formula

in which R represents alkyl or hydrogen, R' alkyl, aryl or hydrogen, and R" alkyl or hydrogen, are obtained by heating amino benzene sulphonamides with phosphorus oxychloride. By reaction with alkalis, ammonia or amines, the phosphoric acid dichlorides thus obtained can be transformed into phosphoric acids or phosphamic acids of 4-amino benzene sulphonamides having a strong bactericidal action which do not cause any irritation. These acids form easily soluble neutral salts which may be used for injection purposes.

It has now been found that also with other bactericidal compounds containing sulphur and possessing one or several amino groups phosphoric acid dichlorides can be obtained on heating with phosphorus oxychloride. If several amino groups are present, each of them is substituted by a phosphoric acid dichloride radical. The sulphurous amino compounds having a bactericidal action can be heated with phosphorus oxychloride themselves or in the form of their salts. The mono or polyphosphoric acid dichlorides obtained represent important intermediate products in the manufacture of easily soluble non-irritating medicinal preparations. They are obtained by treatment of mono or polyphosphoric acid dichlorides with alkalis, ammonia or amines.

The following compounds, for instance, may be used for carrying out the process: Derivatives of sulphanilic acid amide, such as 4-amino benzene sulphonyl sulphanilamide (disulphanilamide) and 4-amino benzene sulphonyl sulphanilic acid dimethyl amide; bactericidal derivatives of sulphanilic acid anilides, such as sulphanilic acid-4-nitroanilide, sulphanilic acid-4-aminoanilide and sulphanilic acid-3-aminoanilide; sulphurous compounds having a bactericidal action without sulphonamide groups, such as derivatives of diaryl sulphides, diaryl disulphides and the corresponding sulphoxides and sulphones, for instance 4,4'-diamino diphenyl sulphide, 4,4'-diamino diphenyl sulphoxide, 4,4'-diamino diphenyl sulphone, 4-amino-4'-nitro-diphenyl sulphone; also bactericidal derivatives of diarylsulphide (sulphoxide, sulphone) sulphonamides, such as, for instance, 4-amino diphenyl sulphide-4'-sulphonamide, 4-amino diphenyl sulphone-4'-sulphonamide; bactericidal derivatives of arylalkyl sulphides, sulphoxide and sulphones, such as 4-amino thiophenol propyl ether.

Example 1

20 parts by weight of 4-amino benzene sulphonyl sulphanilic acid dimethyl amide are boiled for some time with 50 parts by weight of phosphorus oxychloride. When still warm, the clear solution is stirred into a mixture of 100 parts by weight of benzene and 100 parts by weight of petroleum ether. The resulting phosphoric acid dichloride of the formula

soon solidifies. It is triturated with a little petroleum ether, sucked off and dried in vacuo. It decomposes when left in a moist atmosphere, and, with alkalis, ammonia, or amines, splits off 2 molecules of hydrochloric acid and is transformed into a phosphoric acid or phosphamic acid.

Example 2

50 parts by weight of sulphanilic acid-4-amino anilide are boiled with 200 parts by weight of phosphorus oxychloride until a solution is obtained. The liquid is then poured into a mixture of 400 parts by weight of benzene petroleum ether whereupon the reaction product solidifies. It is triturated with petroleum ether, sucked off and dried in vacuo. The resulting product is of the formula Cl₂PONHC₆H₄SO₂NHC₆H₄NHPOCl₂ and, with alkalis, ammonia or amine, splits off 4 molecules of hydrochloric acid on conversion into the corresponding phosphoric acid derivatives. It is also decomposed by moist air and water.

Example 3

20 parts by weight of sulphanilic acid-4-nitroanilide are boiled with 40 parts by weight of phosphorus oxychloride and the resulting solution poured into 200 parts by weight of benzene petroleum ether. The solidified reaction product is sucked off and dried in vacuo. It has the formula Cl₂PONHC₆H₄SO₂NHC₆H₄NO₂. On decomposition it splits off 2 molecules of hydrochloric acid.

Example 4

20 parts by weight of 4,4'-diamino diphenyl sulphide are boiled for some time with 80 parts by weight of phosphorus oxychloride and the clear solution stirred into a mixture of 300 parts by weight of benzene petroleum ether. The reaction product solidifies and, after decanting the liquid, triturated with 100 parts by weight of petroleum ether. It is sucked off, washed with petroleum ether and dried in vacuo. The resulting compound has the formula Cl₂PONHC₆H₄SC₆H₄NHPOCl₂

By reaction with alkalis, ammonia or amines, 4 molecules of hydrochloric acid are split off on conversion into the corresponding phosphoric acid derivatives.

*Example 5*

10 parts by weight of 4,4'-diamino diphenyl sulphoxide are boiled with 30 parts by weight of phosphorus oxychloride until solution sets in. The liquid is poured into a mixture of benzene petroleum ether and the solidified reaction product triturated with petroleum ether. It is then sucked off and dried in vacuo. It has the formula Cl₂PONHC₆H₄SOC₆H₄NHPOCl₂. On decomposition 4 parts by weight of hydrochloric acid are split off.

*Example 6*

10 parts by weight of 4-amino benzene sulphonyl sulphanilic acid amide are boiled with 25 parts by weight of phosphorus oxychloride. The hot solution is poured into a mixture of 100 parts by weight of benzene and 100 parts by weight of petroleum ether whereby the resulting dichloride of the formula Cl₂PONHC₆H₄SO₂NHC₆H₄SO₂NH₂ solidifies. It is triturated with petroleum ether, sucked off and dried in vacuo. It decomposes in moist atmosphere and, with alkalis, ammonia or amines, splits off 2 molecules of hydrochloric acid.

*Example 7*

10 parts by weight of 4,4'-diamino diphenyl sulphone are boiled with 30 parts by weight of phosphorus oxychloride until a solution is obtained. The liquid is poured into a mixture of benzene petroleum ether. The solidified reaction product is triturated with petroleum ether. It is sucked off and dried in vacuo. It has the formula Cl₂PONHC₆H₄SO₂C₆H₄NHPOCl₂. On decomposition with alkalis or ammonia 4 molecules of hydrochloric acid are split off.

I claim:

1. Compounds of the formula

wherein R represents a radical selected from the group consisting of hydrogen, alkyl and aralkyl radicals, R' represents a sulphurous radical selected from the group consisting of —SO—, —SO₂— and —SO₂NH— radicals, and R'' represents a radical selected from the group consisting of sulphon amido, sulphon alkyl amido, sulphon dialkyl amido, dialkyl amino, acyl amino, and phosphoric acid dichloride amino radicals said radical R'' being in a position selected from the group consisting of para and meta positions.

2. The 4-(dichlorophosphamyl)-benzene sulphonyl sulphanilic acid amide.

3. The 4-(dichlorophosphamyl)-benzene sulphonyl sulphanilic acid dimethylamide.

4. The 4,4'-di-(dichlorophosphamyl)-diphenyl sulphone.

5. Process for the manufacture of compounds of the formula

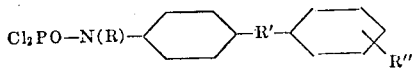

wherein R represents a radical selected from the group consisting of hydrogen, alkyl and aralkyl radicals, R' represents a sulphurous radical selected from the group consisting of —SO—, —SO₂—, and —SO₂NH— radicals, and R'' represents a radical selected from the group consisting of sulphon amido, sulphon alkyl amido, sulphon dialkyl amido, dialkyl amino, acyl amino, and phosphoric acid dichloride amino radicals, said radical R'' being in a position selected from the group consisting of para and meta positions, comprising heating compounds of the formula

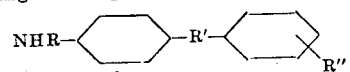

with phosphorus oxychloride.

6. Process for the manufacture of compounds of the formula

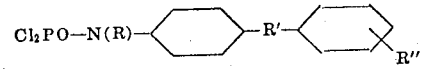

wherein R represents a radical selected from the group consisting of hydrogen, alkyl and aralkyl radicals, R' represents a sulphurous radical selected from the group consisting of —SO—, —SO₂— and —SO₂NH— radicals, and R'' represents a radical selected from the group consisting of sulphon amido, sulphon alkyl amido, sulphon dialkyl amido, dialkyl amino, acyl amino, and phosphoric acid dichloride amino radicals, said radical R'' being in a position selected from the group consisting of para and meta positions, comprising heating compounds of the formula

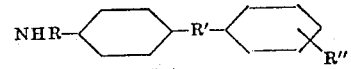

with phosphorus oxychloride, and pouring the reaction mixture into a solvent in which the condensation product is insoluble to isolate the condensation product formed.

7. Process for the manufacture of the phosphoric acid dichloride of 4-amino benzene sulphonyl sulphanilic acid amide, comprising heating 4-amino benzene sulphonyl sulphanilic acid amide with phosphorus oxychloride.

8. Process for the manufacture of the phosphoric acid dichloride of 4-amino benzene sulphonyl sulphanilic acid dimethylamide, comprising heating 4-amino benzene sulphonyl sulphanilic acid dimethylamide with phosphorus oxychloride.

9. Process for the manufacture of the phosphoric acid dichloride of 4,4'-diamino diphenyl sulphone, comprising heating 4,4'-diamino diphenyl sulphone with phosphorus oxychloride.

KURT WARNAT.